Oct. 3, 1967  D. G. FAWKES  3,345,033
SHAFT SEAL FOR A BUTTERFLY VALVE
Filed June 15, 1965  2 Sheets-Sheet 1
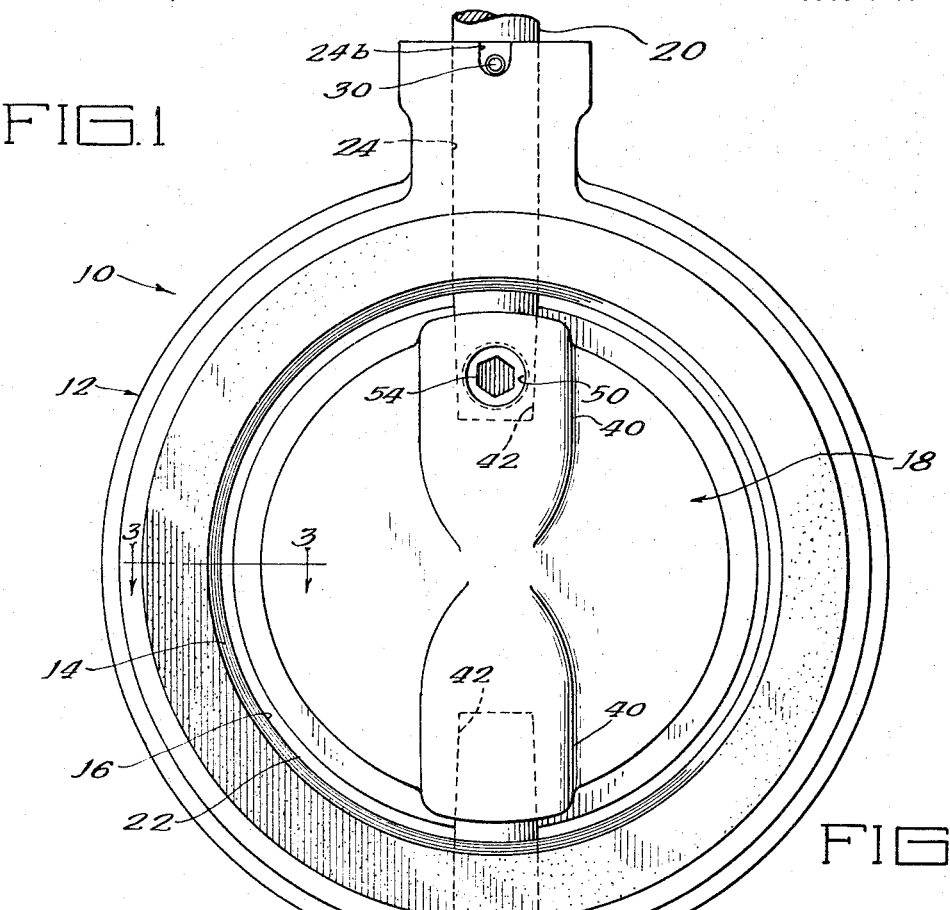
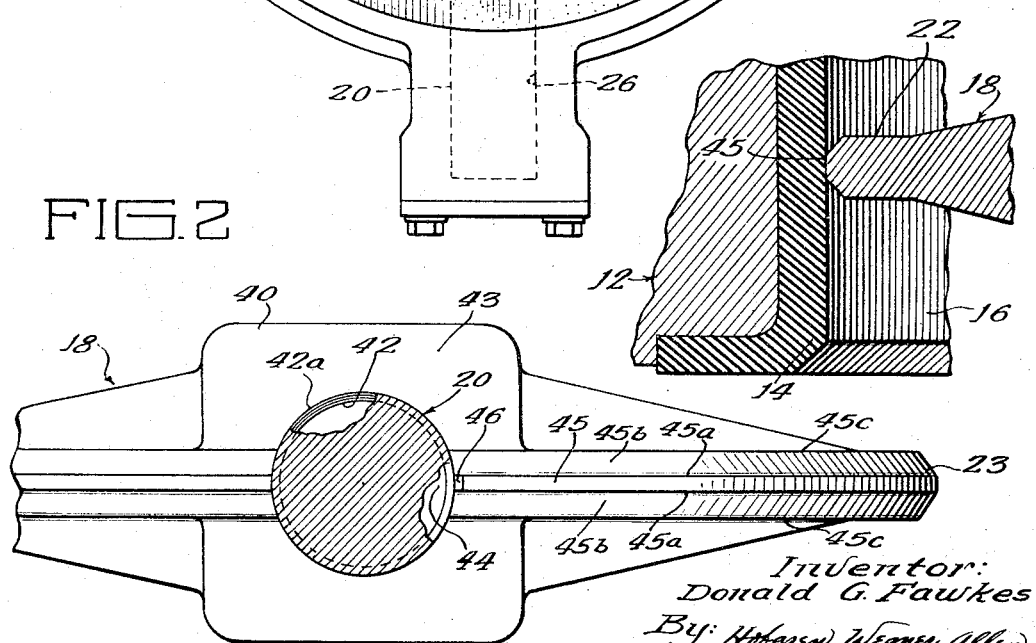
Inventor:
Donald G. Fawkes
By: Hofgren, Wegner, Allen,
Stellman & McCord
Attorneys

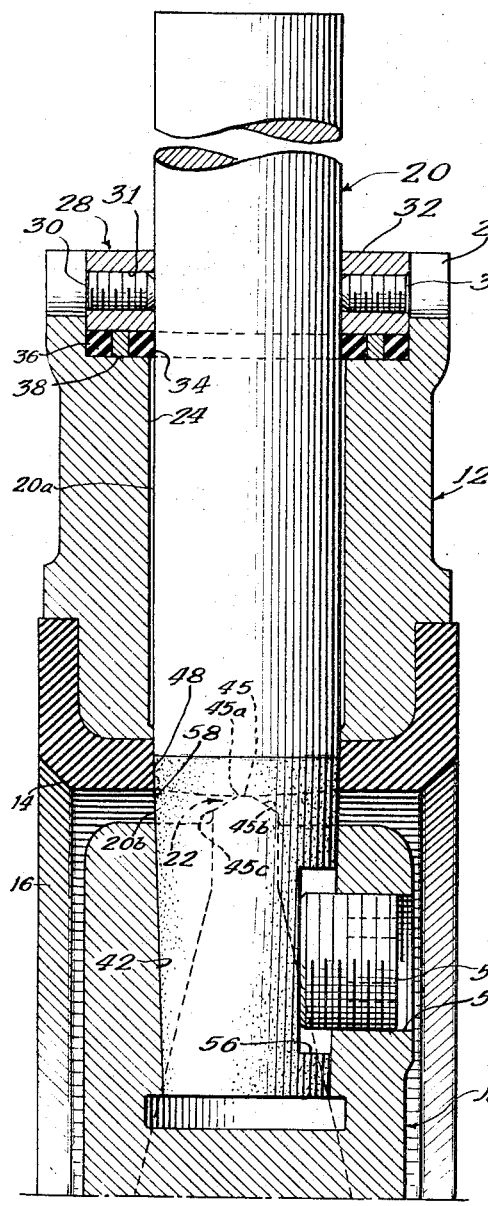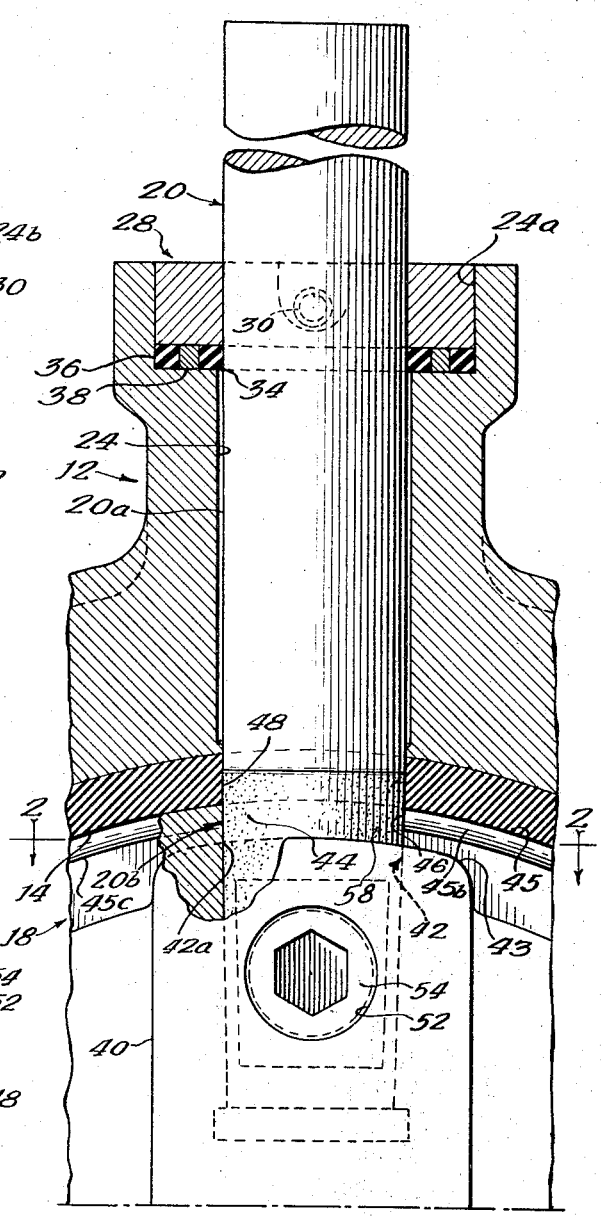

United States Patent Office 3,345,033
Patented Oct. 3, 1967

3,345,033
SHAFT SEAL FOR A BUTTERFLY VALVE
Donald G. Fawkes, Chicago, Ill., assignor to Henry Pratt Company, a corporation of Illinois
Filed June 15, 1965, Ser. No. 464,040
9 Claims. (Cl. 251—308)

This invention relates to valves and more particularly to a new and improved shaft seal for a butterfly valve.

In typical butterfly valve construction, a valve body which is to be joined into a pipe line is provided with a generally cylindrical fluid passage therethrough. A valve disc is mounted in the flow passage for movement between a closed position, wherein the periphery of the disc is in sealing engagement with the inner periphery of the fluid passage, and an open position which permits the flow of fluid through the valve. Typically the butterfly valve swings through an axis which is substantially upright relative to the axis of the valve body. For this purpose, the valve is mounted on shafts which project through the valve body into an opening in the valve disc to which the shafts are secured. Usually the valve disc is provided with an enlarged hub to accommodate the opening which receives the shaft. There is a substantial surface area about the opening in the outer surface of the hub which may contact the inner periphery of the valve body fluid passage. After repeated openings and closings of the valve disc, this contact between the outer surface of the hub and the inner periphery of the valve body may cause a sufficient amount of wear to substantially lessen the effectiveness of the seal in this area.

It is therefore a general object of this invention to provide a new and improved butterfly valve.

It is a primary object of this invention to provide a new and improved butterfly valve having a novel seal between the valve disc mounting shaft, the valve disc, and the valve body.

Another object of this invention is to provide a new and improved butterfly valve wherein the outer surface of the hub which receives the mounting shaft does not contact the seating surface on the inner periphery of the valve body.

Still another object of this invention is to provide a new and improved butterfly valve having a valve disc with a peripheral sealing edge wherein the mounting shaft for the valve disc forms a seal with the peripheral sealing edge of the valve disc.

Yet another object of this invention is to provide a new and improved butterfly valve wherein the valve disc hub outer surface is spaced from the seating surface of the valve body and wherein the supporting shaft openings in the hubs as well as the supporting shafts themselves are tapered.

A further object of this invention is to provide a new and improved butterfly valve having a valve disc with a peripheral sealing edge and enlarged hubs having an outer surface and a stub shaft receiving opening extending through the outer surface; and wherein the outer surface of the hub is spaced from the seating surface of the valve body and the supporting stub shafts are tapered so that the outer periphery of the stub shafts engages the seating surface of the valve body and the peripheral sealing edge of the valve disc in sealing relation therewith.

Other objects, features and advantages of the present invention will be apparent from the following description of the preferred embodiments illustrated in the accompanying drawings, in which:

FIGURE 1 is an end elevational view of a butterfly valve embodying the novel mounting and sealing arrangement of this invention;

FIGURE 2 is a fragmentary sectional view of the valve disc with the supporting stub shaft mounted therein taken along the line 2—2 of FIGURE 5 which generally describes the outer surface of the peripheral sealing edge of the valve disc;

FIGURE 3 is an enlarged fragmentary sectional view of a portion of the valve body taken along the line 3—3 of FIGURE 1 showing the relationship of the peripheral edge of the valve disc sealing against the seating surface of the valve body;

FIGURE 4 is a fragmentary, enlarged, partially broken sectional view showing the mounting of the stub shaft relative to the valve housing and valve dics; and FIGURE 5 is a fragmentary enlarged broken sectional view taken through a plane substantially transverse to the axis of the valve body.

Referring now to the drawings, in FIGURE 1 there is shown a butterfly valve 10 including a valve housing 12 having a resilient sealing ring 14 mounted in the fluid passage 16. A valve disc 18 is mounted on stub shafts 20 for movement between a fully closed position as shown in FIGURE 1, wherein the peripheral edge 22 of the disc is in sealing engagement with the seating surface or sealing ring 14 of the valve body, and an open position (not shown) wherein fluid may flow through the valve body.

The stub shafts 20 have a generally circular cylindrical shank portion 20a and a tapered frusto-concial end portion 20. The shank portion 20a is positioned in an opening 24 on each side of the valve body generally diametrically opposite from each other. As seen in greater detail in FIGURES 4 and 5, opening 24 may have an enlarged end 24a which is externally notched as at 24b for receiving the packing or sealing and bearing assembly 28. This assembly includes set screws 30 threaded in openings 31 in block 32. The set screws bear against the sides of the stub shafts to generally orient the shafts relative to the opening in the valve body and the valve disc. Further included in the assembly 28 are O-ring seals 34 and 36 held apart by spacer ring 38. The outer O-ring 36 seals at the outside diameter of the thrust bearing collar and the inner O-ring 34 seals at the inside diameter of the thrust bearing collar. This novel O-ring arrangement provides an economical yet efficient seal in this environment.

The valve disc is provided with enlarged hubs 40 having stub shaft receiving openings 42. The openings 42 terminate in, and form a ring-like edge 42a with, upper face 43 of the hub which is spaced from the seating ring 14 of the valve body. In previously known butterfly valves of the type, the surface 43 of the hub was adjacent the sealing surface 14. Repeated rotation of the valve shaft caused repeated rubbing of the hub face against the seating surface which eventually resulted in a leakage of the fluid through this point.

In order to eliminate this problem, the butterfly valve of this invention has the hub face 43 spaced from the sealing surface, and incorporates the novel sealing relation between the stub shaft and the valve disc and valve housing as explained herein. The stub shaft receiving opening 42 is continued as an opening 44 through the peripheral sealing edge of the valve disc. As shown in the drawings, these openings 42 and 44 are slightly tapered to accommodate the tapered end 20b of the stub shaft and insure a proper sealing engagement therewith.

The actual sealing surface of the peripheral edge of the valve disc is a generally flat annular ring 45 having two parallel ring-like edges 45a. The peripheral edge has tapered sides 45b which extend away from the edges 45a and terminate in the disc faces at the spaced parallel edges 45c. The opening 44 in the peripheral sealing edge forms a radial shoulder or sealing surface 46 on either side of the opening at the intersection between hub face 43 and the annular ring 45.

In the illustrated embodiment, the sealing ring opening 48 is also partially tapered to accommodate the slight tapered end 20b of the stub shaft. The opening 48 may be cylindrical, if desired, and the inner diameter may be formed slightly smaller than the outer diameter of the shaft. The resilience of the sealing ring will cause it to tightly squeeze about the shaft and produce a good seal.

In assembly, the stub shaft may be inserted through the openings in the valve body and driven into the opening 42 in the valve disc. The tapered end of the stub shaft and the tapered opening 42 in the valve disc, as well as the tapers in the surfaces 46 and the opening 48 in the sealing ring, permit the end of the stub shaft to undergo a wedging action with respect to these openings so that the opening 42 in the disc hub as well as the shoulder 46 and the opening 48 in the sealing ring 14 seal about the frusto-conical end 20b of the valve shaft. The line of sealing about the portion 20b of the stub shaft is defined by the sealing edge 45, the tapered sides 45b, that portion of the valve disc from edges 45c to the opening 42 in the hub face, and the edge 42a of the hub opening. The seal between the sealing ring and the valve shaft is a live seal, whereas the seal between the valve shaft surface 20b and the opening 42 is a static seal which prevents leakage past the hub portion of the disc in such a manner as to minimize wear on the sealing ring.

For securing the stub shafts in the valve disc, the hubs of the valve disc may be provided with laterally opening bores 52 in which a set screw 54 is threaded. The stub shaft may be provided with an elongate notch 56 providing a flattened surface for receiving the head of the set screw to secure the stub shaft in the disc. The notched or flattened portion of the valve shaft against which the threaded set screw bears is preferably longer than the diameter of the set screw to provide some tolerance in the distance in which the shaft is driven into the valve disc.

As shown in FIGURE 4, the tapered surface 20b of the valve shaft may be provided with a thin film of compressible material 58 such as Teflon or similar plastic material. This material 58 aids in the wedging action of the tapered end of the shaft and tapered bores in that the film compresses while the shaft is driven into the openings.

The butterfly valve of this invention avoids the former problem of excessive wear in the valve seat adjacent the hub of the valve disc by spacing the hub radially inwardly from the valve seat so that the enlarged outer surface of the hub does not contact the valve seat as the disc is rotated between the open and closed positions. To establish a seal at this point, the opening in the hub is continued through the peripheral sealing edge of the disc forming upstanding radial shoulders. Preferably this opening is tapered slightly inwardly and the disc engaging end of the stub shaft has a slight frusto-conical configuration so that the taper of the shaft and the opening may permit a wedging action between the two to insure a snug sealing engagement as the stub shaft is inserted into the opening. The addition of a thin film of compressible material about the frusto-conical end of the stub shaft may aid in establishing a fluid-tight seal.

The foregoing detailed description has been given for clearness of understanding only, and no unnecessary limitations should be understood therefrom, as some modifications may be obvious to those skilled in the art.

I claim:

1. A butterfly valve, comprising: a valve body having a fluid passage therethrough; a valve disc having a peripheral sealing edge and mounted in said valve body for movement between a closed position wherein the periphery of the disc is in sealing engagement with the valve body and an open position permitting fluid flow through the valve body, said valve disc having a pair of opposed stub shaft openings which interrupt the peripheral sealing edge throughout the entire thickness of the peripheral sealing edge at the place of interruption, and said openings forming a radial shoulder with said peripheral sealing edge on either side of the opening; and a pair of stub shafts, one on either side of the housing for supporting and mounting the disc in the valve body, each stub shaft having a disc engaging end which extends through the valve body and peripheral sealing edge interruption into the stub shaft openings in sealing engagement with said radial shoulders and the opening in the valve disc.

2. The butterfly valve of claim 1 wherein said stub shaft disc engaging end is provided with a thin film of compressible material which may be compressed when the stub shaft is driven into the stub shaft openings in the valve disc.

3. The butterfly valve of claim 1 wherein the radial surface between the peripheral sealing edge and the stub shaft opening is tapered inwardly.

4. The butterfly valve of claim 3 wherein said stub shaft openings and said stub shaft disc engaging ends are tapered.

5. A butterfly valve, comprising: a valve body having stub shaft openings and a fluid passage therethrough; a sealing ring in the valve body fluid passage having stub shaft openings in registry with said valve body stub shaft openings; a valve disc having a peripheral sealing edge and mounted in said valve body fluid passage for movement between a closed position wherein the peripheral sealing edge of the disc is in sealing engagement with the sealing ring, and an open position permitting fluid flow through the valve body; a pair of opposed enlarged hubs on the valve disc, the outer surface of each of said hubs being spaced radially inwardly from said peripheral sealing edge, said hubs further having stub shaft openings which open through said hub outer surfaces and through said peripheral sealing edge forming a radial shoulder with the peripheral edge of said valve disc on each side of each of the hub openings; and a pair of stub shafts, one on each side of the housing for supporting and mounting the disc in the valve body, each stub shaft having a disc engaging end which extends through the valve body and the openings in the valve disc peripheral sealing edge and is secured in the hub openings to provide an active seal with the valve body sealing ring and a static seal with the valve disc, said static seal defined by the radial shoulders of the peripheral sealing edge and the edge of the opening in the outer surface of each hub between said radial shoulders.

6. The butterfly valve of claim 5 wherein said stub shaft disc engaging end is provided with a thin film of compressible material which may be compressed when the stub shaft is driven into the stub shaft openings in the valve disc.

7. A butterfly valve, comprising: a valve body having a pair of opposed stub shaft openings and a fluid passage therethrough; a sealing ring in the valve body fluid passage having stub shaft openings in registry with said valve body stub shaft openings; a valve disc having a reduced thickness peripheral sealing edge, said valve disc mounted in said valve body fluid passage for movement between a closed position wherein the peripheral sealing edge of the disc is in sealing engagement with the sealing ring and an open position permitting fluid flow through the valve body, said peripheral sealing edge having radially outwardly tapered stub shaft openings in registry with said valve body stub shaft openings; a pair of opposed enlarged hubs on the valve disc, the outer surface of each of said hubs being spaced radially inwardly from said peripheral sealing edge so that said peripheral edge stub shaft openings form a pair of radial shoulders tapering outwardly from said hub outer surfaces, each of said hubs having tapered stub shaft openings which open through said hub outer surfaces in registry with said peripheral sealing edge stub shaft openings;

and a pair of stub shafts, one on each side of the housing for supporting and mounting the disc in the valve body, each stub shaft having a disc engaging end which extends through the valve body and the openings in the valve disc peripheral sealing edge and is secured in the hub openings to provide an active seal with the valve body sealing ring and a static seal with the valve disc, said static seal defined by the radial shoulders of the peripheral sealing edge and the edge of the opening in the outer surface of each hub between said radial shoulders.

8. The butterfly valve of claim 7 wherein a set screw extends through the valve disc into the stub shaft opening for engagement with the stub shaft.

9. The butterfly valve of claim 8 wherein the disc engaging end is provided with a flattened portion for engagement with said set screw, said flattened portion being longer than the diameter of said set screw.

No references cited.

M. CARY NELSON, *Primary Examiner.*

R. C. MILLER, *Assistant Examiner.*